US009940175B2

(12) United States Patent
He et al.

(10) Patent No.: US 9,940,175 B2
(45) Date of Patent: Apr. 10, 2018

(54) JOINT NETWORK AND TASK SCHEDULING

(71) Applicant: International Business Machines Corporation, Armonk, NY (US)

(72) Inventors: Ting He, Piermont, NY (US); Thai Franck Le, White Plains, NY (US); Ali Munir, East Lansing, MI (US); Ramya Raghavendra, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/087,079

(22) Filed: Mar. 31, 2016

(65) Prior Publication Data

US 2017/0286180 A1 Oct. 5, 2017

(51) Int. Cl.
*G06F 9/46* (2006.01)
*G06F 9/50* (2006.01)
*G06F 9/48* (2006.01)

(52) U.S. Cl.
CPC ......... *G06F 9/5088* (2013.01); *G06F 9/4881* (2013.01); *G06F 9/5038* (2013.01); *G06F 9/5077* (2013.01)

(58) Field of Classification Search
None
See application file for complete search history.

(56) References Cited

U.S. PATENT DOCUMENTS

| 6,728,748 B1 * | 4/2004 | Mangipudi | ........... H04L 69/329 709/226 |
| 8,707,314 B2 * | 4/2014 | Gummaraju | .......... G06F 9/5044 718/102 |
| 2015/0277990 A1 | 10/2015 | Xiong et al. | |

OTHER PUBLICATIONS

Arslan et al., "Locality and Network-Aware Reduce Task Scheduling for Data-Intensive Applications," Proceedings of the 5th International Workshop on Data-Intensive Computing in the Clouds (DataCloud '14), pp. 17-24 (Nov. 2014).

Hong et al., "Finishing Flows Quickly with Preemptive Scheduling," Proceedings of the ACM SIGCOMM 2012 conference on Applications, technologies, architectures, and protocols for computer communication, SIGCOMM '12, pp. 127-138 (Aug. 2012).

(Continued)

*Primary Examiner* — Gregory A Kessler
(74) *Attorney, Agent, or Firm* — Jennifer R. Davis; Michael J. Chang, LLC (57) ABSTRACT

Techniques for network state-aware and network scheduling policy-aware task scheduling are provided. In one aspect, a method for scheduling tasks in a distributed computing network includes the steps of: collecting a pool of candidate resources in the distributed computing network for performing a given one of the tasks; predicting a performance of each of the candidate resources in performing the given task based on both i) a state and ii) a scheduling policy of the distributed computing network; and selecting a best candidate resource for the given task based on the performance. A system for scheduling tasks in a distributed computing network is also provided which includes a task scheduler; and a network scheduler, wherein the task scheduler is configured to schedule the tasks in the distributed computing network based on both i) the state and ii) the scheduling policy of the distributed computing network.

17 Claims, 9 Drawing Sheets

(56) References Cited

OTHER PUBLICATIONS

M. Alizadeh et al., "pFabric: Minimal Near-Optimal Datacenter Transport," ACM SIGCOMM Computer Communication Review, 43 (4): 435-446, Aug. 2013.
M. Alizadeh et al., "Data Center TCP (DCTCP)," ACM SIGCOMM Computer Communication Review, 41 (4): 63-74, 2011.
A. Munir et al., "Friends, not Foes: Synthesizing Existing Transport Strategies for Data Center Networks," Proceedings of the 2014 ACM SIGCOMM, pp. 491-502, Aug. 2014.
Zaharia et al., "Delay Scheduling: A Simple Technique for Achieving Locality and Fairness in Cluster Scheduling," Proceedings of the 5th European Conference on Computer Systems, EuroSys '10, pp. 265-278 (Apr. 2010).
Anonymous, "A Method and System for Dynamically Reconfiguring a Network Based on Traffic Demand of a Big Data Application," IPCOM000234595D, Jan. 21, 2014 (5 pages).
Peng Qin et al., "Bandwidth-Aware Scheduling with SDN in Hadoop: A New Trend for Big Data," IEEE Systems Journal, pp. 1-8, Mar. 2014.

* cited by examiner

- Input: Compressed network state (FlowSize stats, FlowBytes bin stats)
- Output: Candidate Node
- Algo: For each server:
  - NodePrio = minSize of flows scheduled on the network
  - $nodeFCT = \frac{1}{B} \sum_{f: s_f < s} s_f + \frac{s}{B} |\{f : s_f \geq s\}|$

- Choose node and (set found = 1) if
    - NodeFCT == 0 → if it is free OR
    - If nodePrio >= flowPrio && nodeFCT <= minFCT →

// node has minimum FCT and prio same or higher than flow
    // among ties choose the one that gives the minFCT
  - If found != 1
    - Choose node that has least number of flows scheduled on it.

JOINT NETWORK AND TASK SCHEDULING

STATEMENT OF GOVERNMENT RIGHTS

This invention was made with Government support under Contract number W911NF-06-3-0001 awarded by U.S. Army. The Government has certain rights in this invention.

FIELD OF THE INVENTION

The present invention relates to scheduling tasks in a distributed computing network, and more particularly, to techniques for network state-aware and network scheduling policy-aware task scheduling in a distributed computing network.

BACKGROUND OF THE INVENTION

Cloud and data centers have a greater-than-ever need to satisfy analytics running on big data (e.g., MapReduce, Pregel, message passing interface (MPI), Dryad, etc.). Fast data transmission is needed to deliver good performance, e.g., shuffling accounts for 30% of MapReduce time.

A shared computing cluster imposes further challenges with workloads of mixed priorities and performance goals. For instance, a service job (e.g., an online application) is sensitive to delays, while a batch job (to be executed as a single unit) is sensitive to bandwidth.

Existing approaches include using task schedulers to place tasks close to data (maximizing data locality) to minimize network traffic. These schedulers, however, design a traffic matrix assuming fair sharing of network resources amongst the tasks. Thus there might be policy considerations (such as priorities that can vary over time) which cannot be accounted for with a conventional task scheduler.

Network schedulers schedule flows based on properties of the tasks generating them (such as flow size, deadline, priority, which flows belong to the same task (co-flow), etc.). Essentially, a network scheduler attempts to schedule flows belonging to the same task to make progress together. Therefore, network schedulers can improve the basic transmission control protocol (TCP) by not sharing the network resources fairly.

Schedulers for improving performance of analytics on big data would be desirable.

SUMMARY OF THE INVENTION

The present invention provides techniques for network state-aware and network scheduling policy-aware task scheduling in a distributed computing network. In one aspect of the invention, a method for scheduling tasks in a distributed computing network is provided. The method includes the steps of: collecting a pool of candidate resources in the distributed computing network for performing a given one of the tasks; predicting a performance of each of the candidate resources in performing the given task based on both i) a state and ii) a scheduling policy of the distributed computing network; and selecting a best candidate resource for the given task based on the performance.

In another aspect of the invention, a system for scheduling tasks in a distributed computing network is provided. The system includes a task scheduler; and a network scheduler, wherein the network scheduler is configured to provide a state and a scheduling policy of the distributed computing network to the task scheduler, and wherein the task scheduler is configured to schedule the tasks in the distributed computing network based on both i) the state and ii) the scheduling policy of the distributed computing network. For instance, the network scheduler can be configured to collect a pool of candidate resources in the distributed computing network for performing a given one of the tasks; predict a performance of each of the candidate resources in performing the given task based on both i) a state and ii) a scheduling policy of the distributed computing network; and select a best candidate resource for the given task based on the performance.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for joint task and network scheduling which improves overall performance by making the task scheduler aware of the sharing policy or policies used by the network scheduler. This concept is referred to herein as "policy-aware task scheduling." For instance, the network scheduler is aware of co-flows (flows belong to the same task), task priorities, performance goals, etc. Thus, by joining task and network scheduling a joint design of a traffic matrix and flow schedule can be achieved.

Figure 1:
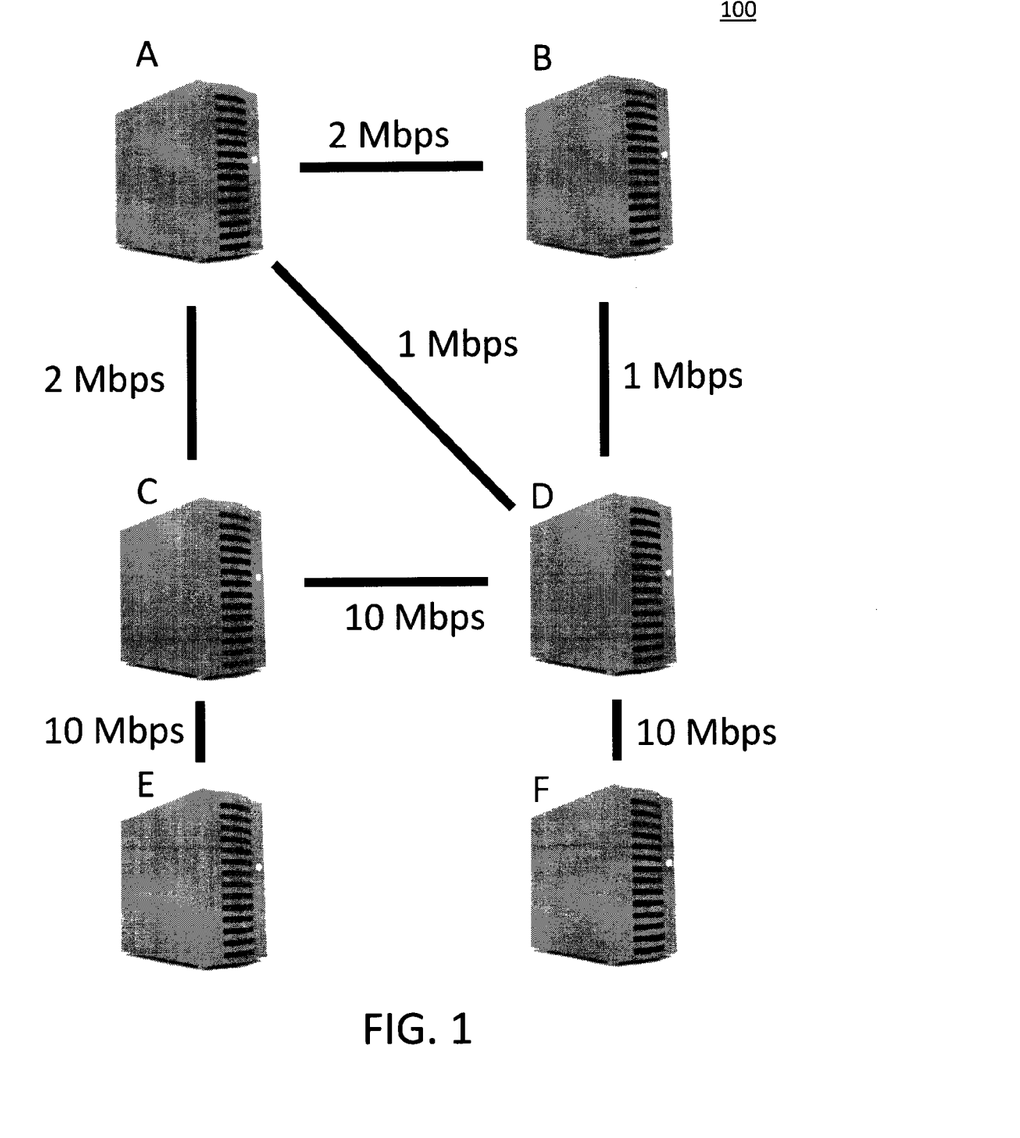
FIG. 1 is a diagram illustrating the topology of an exemplary network according to an embodiment of the present invention.
Figure 2:
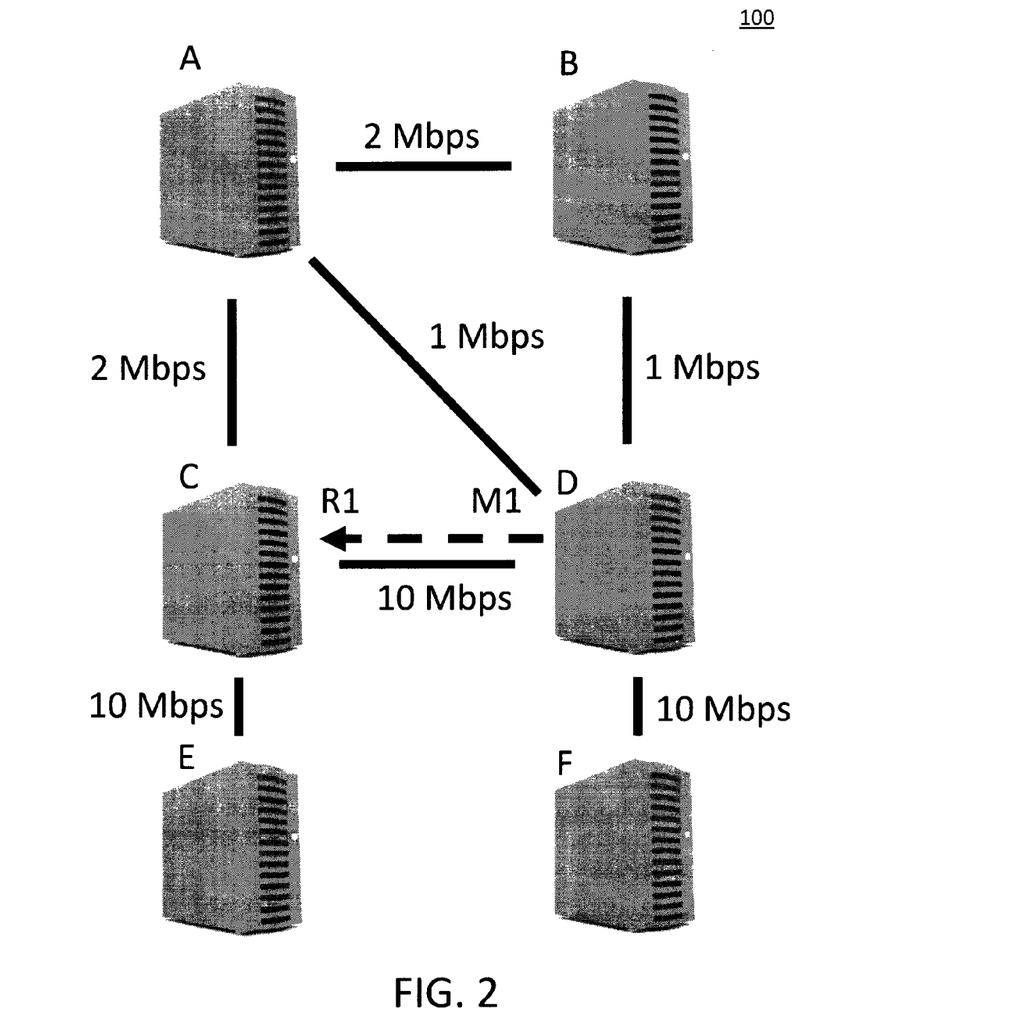
FIG. 2 is a diagram illustrating the scheduling of a first pair of tasks in the network according to an embodiment of the present invention.

An illustrative example is now described by way of reference to FIGS. 1-4. Referring first to FIG. 1, the topology of a network 100 is shown having six servers (labeled A-F). The link capacity between the severs is given. For instance, the highest available bandwidth between server A and server B is 2 megabits per second (Mbps), between servers A and D its 1 Mbps, and so on.

In this example, the workload includes a first pair of low-priority tasks (M1, R1) and then a pair of high-priority tasks (M2, R2). The use of M and R to denote tasks comes from a MapReduce operation where the map (M) and reduce (R) tasks are split amongst distributed servers. However, the present techniques are more generally applicable to any data analytics with task scheduling. For simplicity, assume that each task needs to transfer 10 Mb of data. Assume also that the M2 tasks can run at servers B and F, and the R2 tasks can run at servers A and E (i.e., servers B and F have an available slot to host task M2, and servers A and E have an available slot to host task R2).

To schedule the first pair of tasks (M1, R1), it makes sense to assign tasks M1 and R1 to servers C and D in order to minimize data transfer time and network traffic. See FIG. 2. As a result, the link C-D is fully utilized by (M1, R1), i.e., its available bandwidth is 0, since each task needs to transfer 10 Mb of data (see above).

Since the first pair of tasks are running, in order to schedule the second pair of tasks (M2, R2), one could now take into consideration the network state. See, for example, Arslan et al., "Locality and Network-Aware Reduce Task Scheduling for Data-Intensive Applications," Proceedings of the 5$^{th}$ International Workshop on Data-Intensive Computing in the Clouds (DataCloud '14), pgs. 17-24 (November 2014) (hereinafter "Arslan"), the contents of which are incorporated by reference as if fully set forth herein. Arslan describes an algorithm for task scheduling which takes both data locality and network traffic into consideration. By addressing network traffic, the algorithm attempts to minimize the effect of network congestion in data transfers.

Figure 3:
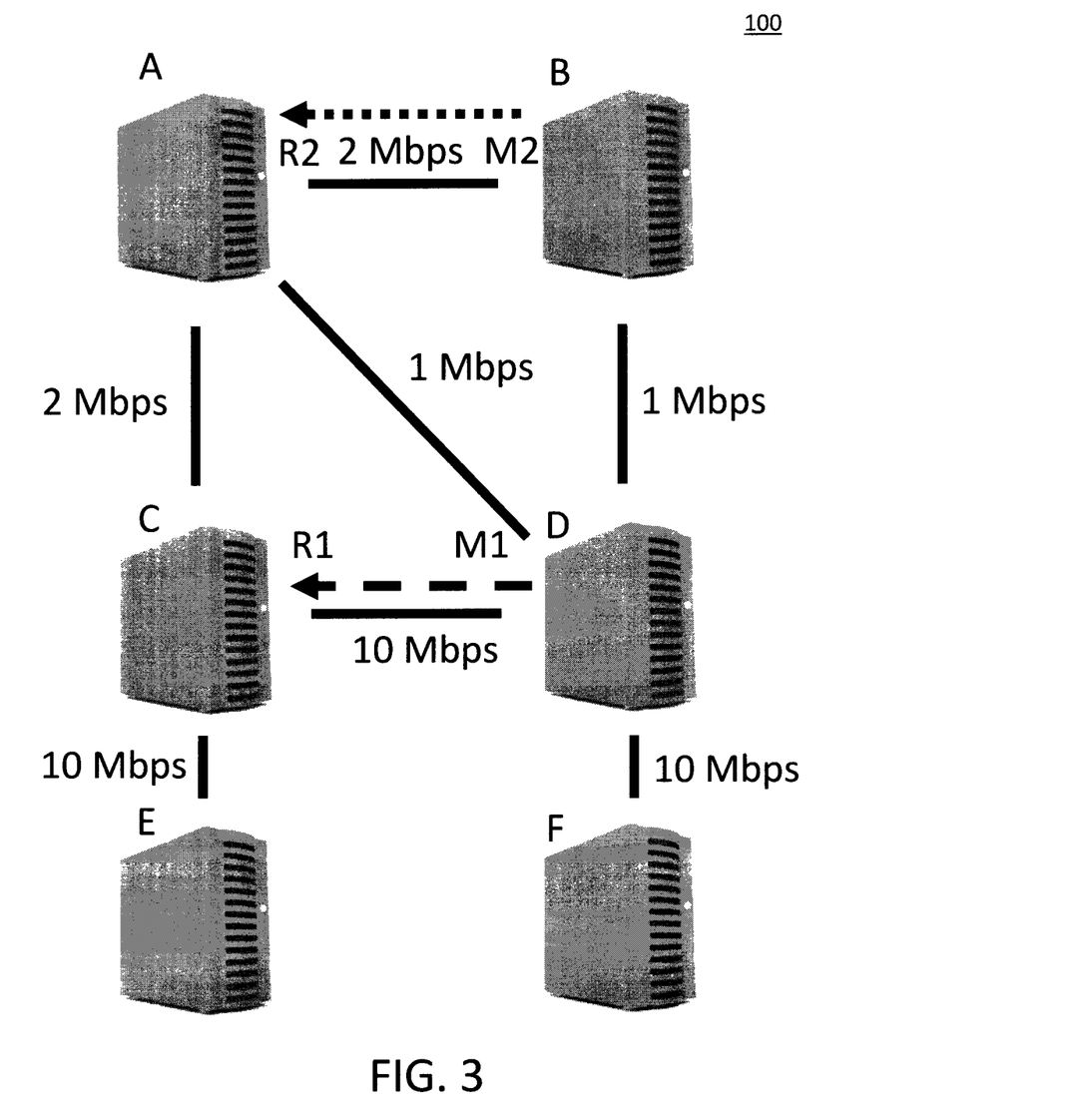
FIG. 3 is a diagram illustrating the scheduling of a second pair of tasks using a network state-aware task scheduler according to an embodiment of the present invention.

FIG. 3 shows the scheduling of the second pair of tasks (M2, R2) using a network state-aware task scheduler. The network state-aware task scheduler takes into account the network state (topology, available bandwidth, etc.). In the current example, since the link C-D currently has 0 available bandwidth, the highest available bandwidth is 2 Mbps between servers A and B. Accordingly, tasks M2, R2 would be assigned to servers A and B. With a 2 Mbps bandwidth, the data transfer for (M2, R2) completes in 5 seconds.

However, performance gains can be realized by taking into account not only the network state, but also the network scheduling policy (e.g., priority). Namely, as noted above, the second pair of tasks (M2 R2) has a higher priority than the first pair of tasks (M1, R1). Thus, according to the present techniques, it is recognized that a lower priority pair of tasks (M1, R1) is using a higher bandwidth connection. The higher bandwidth connection is leveraged for the higher priority tasks (M2, R2), while the flow of lower priority tasks (M1, R1) is either preempted, limited or rerouted to other servers.

Figure 4:
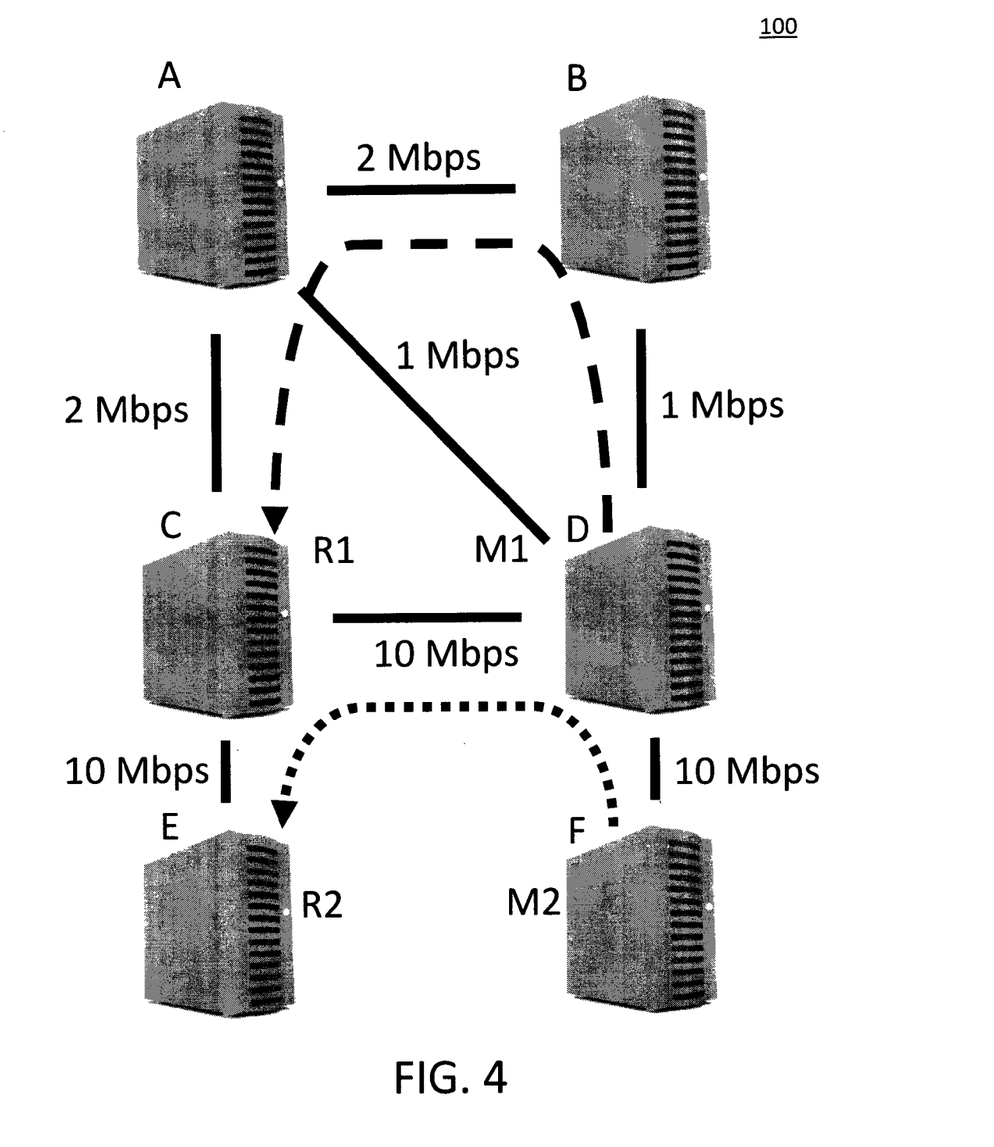
FIG. 4 is a diagram illustrating the scheduling of a second pair of tasks using a network state and policy-aware task scheduler according to an embodiment of the present invention.

Namely, as shown in FIG. 4, in the instant example the task scheduler (which is aware of the network scheduling policy) realizes that the lower priority flow (M1, R1) is using the higher bandwidth connection (C-D). The task scheduler assigns the second tasks (M2, R2) to servers F and E. The network scheduler then either preempts the M1→R1 flow, limits its rate to minimum, or reroutes the M1→R1 flow so as to be able to use the higher bandwidth C-D connection for the higher priority (M2, R2) tasks. In the example depicted in FIG. 4, the flow of the lower priority tasks (M1, R1) is rerouted to traverse servers D-B-A-C. Whether the lower priority flow gets preempted, limited, or rerouted depends on the protocol support as determined by the network scheduler. Flow preemption is described, for example, in Hong et al., "Finishing Flows Quickly with Preemptive Scheduling," Proceedings of the ACM SIGCOMM 2012 conference on Applications, technologies, architectures, and protocols for computer communication, SIGCOMM '12, pgs. 127-138 (August, 2012), the contents of which are incorporated by reference as if fully set forth herein. Routing/re-routing of flows can be implemented using switches, such as top-of-rack (TOR) or end-of-row (EOR) switches, as is known in the art. See, for example, FIG. 5—described below.

By taking into account the network scheduling policy and providing the higher priority with the higher bandwidth, a significant performance gain can be realized. For instance, by comparison with the scenario depicted in FIG. 3, here tasks (M2, R2) complete data transfer in 1 second (as opposed to 5 seconds over the 2 Mbps A-B connection).

Figure 5:
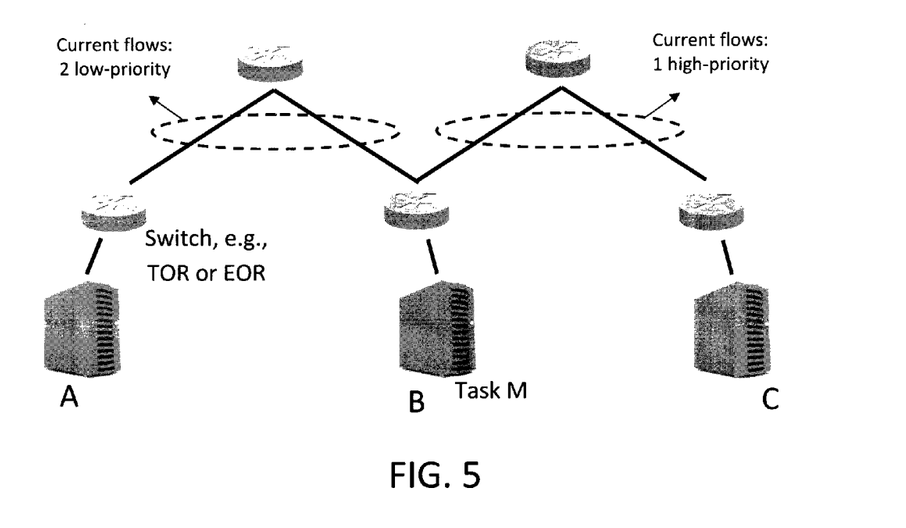
FIG. 5 is a diagram illustrating an exemplary implementation of the present network state and policy-aware task scheduling techniques according to an embodiment of the present invention.

Based on the above-described principles of the present techniques, another illustrative example is now described by way of reference to FIG. 5. In this example, the network is shown as having 3 servers A, B, and C. Switches (e.g., TOR or EOR) are employed to route/re-route flows amongst the servers.

In this example, the task scheduler needs to schedule a task R that needs the output data generated by an existing task M. As shown in FIG. 5, task M is run at server B, and there are 2 (low-priority) existing flows between A-B and 1 (high-priority) existing flow between B-C. If both servers A and C have an available slot to host task R, then the task scheduler has several options. In the case of a network-state aware task scheduler (like that described in conjunction with the description of FIG. 3, above), task R would be placed on server C since B-C has only one existing flow (as opposed to two existing flows on A-B). However, if the task (M, R) is placed on B-C, then it will either have to split bandwidth with the (high-priority) existing flow if (M, R) has high-priority, or be preempted/throttled if (M, R) has low-priority. In either case, performance of task (M, R) will be affected.

On the other hand, if the present network state and scheduling-aware task scheduler is employed, then task R would instead be placed on server A since server A is handling only low-priority flows. Advantageously, this will enhance performance of task (M, R) because if task (M, R) has high-priority then it will not have to share bandwidth with the existing low-priority tasks (i.e., task (M, R) will preempt those low-priority tasks), and if task (M, R) is a low-priority task, then it will not be preempted by the other flows on A-B since they too are low-priority tasks. Thus, in either case, the performance of task (M, R) is improved over the scenario placing the same task at server C. Thus, taking into account both network state and network policy considerations can greatly enhance the scheduler performance.

Figure 6:
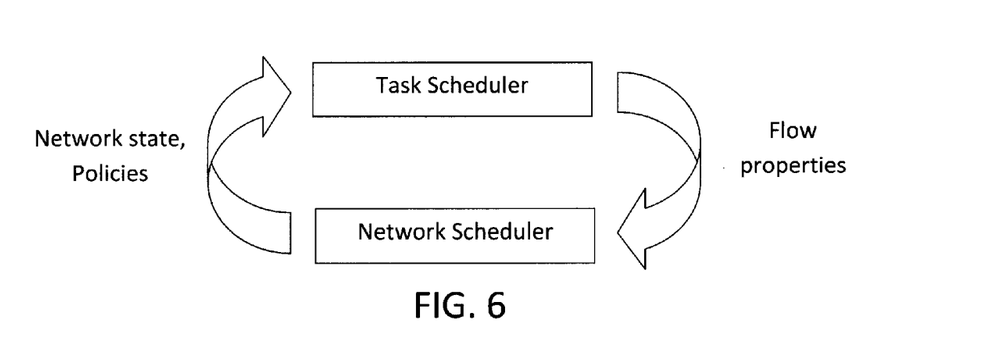
FIG. 6 is a schematic diagram illustrating the present network state and policy-aware task scheduler according to an embodiment of the present invention.

According to the present techniques, a hierarchical scheduling regime is used with a task scheduler (TS) at a higher layer and a network scheduler (NS) as a lower layer. See FIG. 6. According to an exemplary embodiment, the TS layer resides in the application layer and the NS layer resides in the transport layer in the Open System Interconnection (OSI) model. The task scheduler is implemented in software as is generally the practice, and the network scheduler can be implemented in hardware (e.g., pFabric), software (e.g., DCTCP), or both hardware and software (e.g., PASE). See, for example, M. Alizadeh et al., "pFabric: Minimal Near-Optimal Datacenter Transport," ACM SIGCOMM Computer Communication Review, 43 (4): 435-446, August 2013 (pFabric); M. Alizadeh et al., "Data Center TCP (DCTCP)," ACM SIGCOMM Computer Communication Review, 41 (4): 63-74, 2011 (DCTCP); and A. Munir et al., "Friends, not Foes: Synthesizing Existing Transport Strategies for Data Center Networks," Proceedings of the 2014 ACM SIGCOMM, pp. 491-502, August 2014 (PASE), the contents of each of which are incorporated by reference as if fully set forth herein. As shown in FIG. 6, the network scheduler provides network state and policy information to the task scheduler. The network scheduler receives flow properties and goals (e.g., completion time, deadline, etc.) information from the task scheduler. The network scheduler will then schedule flows based on the information it receives from the task scheduler, e.g., task priority, deadline (if any), data size, etc.

The task scheduler provides the flow properties and goals to the network scheduler, and it receives network state and scheduling policy information from the network scheduler. The task scheduler then schedules tasks based on the network state and the network scheduling policy. To date, no scheduler exists that schedules tasks based on network state and network scheduling policy.

Figure 7:
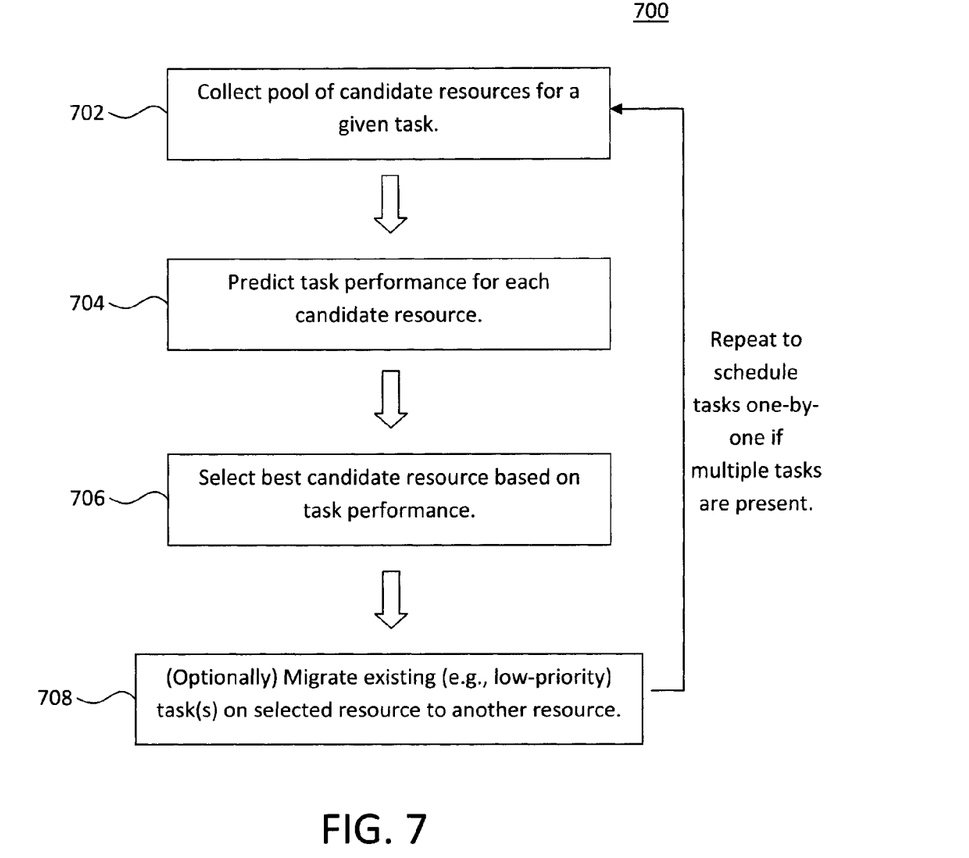
FIG. 7 is a diagram illustrating an exemplary methodology for scheduling tasks in a distributed computing environment according to an embodiment of the present invention.

Given the above description of the present scheduler architecture and operating principles, FIG. 7 provides an exemplary methodology 700 for scheduling tasks in a distributed computing environment. As highlighted above, the task scheduling will be based on both network state and network scheduling policy.

In step 702, a pool of candidate resources is collected for each of the tasks to be scheduled. In the examples above, the candidate resources are the servers in the distributed computing network. Other candidate resources can include, but are not limited to, virtual machines and server containers. According to an exemplary embodiment, delay scheduling can be used to collect the pool of candidate resources. Delay scheduling is described, for example, in Zaharia et al., "Delay Scheduling: A Simple Technique for Achieving Locality and Fairness in Cluster Scheduling," Proceedings of the 5$^{th}$ European Conference on Computer Systems, EuroSys '10, pages 265-278 (April 2010) (hereinafter "Zaharia"), the contents of which are incorporated by reference as if fully set forth herein. As described in Zaharia, delay scheduling involves delaying the launch of certain tasks until optimum (scheduling) conditions can be met. In this case, delaying the launching of a task can provide the scheduler with multiple candidate servers from which the task scheduler can make the optimal scheduling choice based on network state and network scheduling policies. Note, in the examples provided above, there were multiple scheduling options from which an optimal (network state and scheduling policy-based) selection is made.

In step 704, task performance is predicted for each of the candidate resources collected in step 702. According to an exemplary embodiment, task performance is based on flow completion time (FCT)—see below, and is predicted by hypothetically placing a given one of the tasks on one of the candidate resources and analyzing the network schedule.

Based on the task evaluations, in step 706 the best candidate resource is selected for the task. For instance, the server predicted to provide the best (i.e., smallest) FCT can be selected. To use a simple example, "candidate resources" are first selected based on other types of resources required by the task, e.g., CPU, RAM, disk. Then the task scheduler only minimizes FCT among servers satisfying a minimum requirement for each of the other types of resources.

As provided in the examples above, a high-priority task can cause an existing low-priority task on the same resource to be preempted/throttled. In that situation, the affected, low-priority task can optionally be migrated to another resource/server to avoid severe delays. See step 708. As shown in FIG. 7, in the case of multiple tasks, the process can then be repeated to schedule tasks one by one.

As described in conjunction with the description of step 704 above, according to an exemplary embodiment, the task performance prediction can use flow completion time (FCT) as a task performance metric. The FCT varies based on the network state (e.g., size of all active flows) and the underlying network scheduling policy (e.g., fair share, first in first out—FIFO, shortest flow first—SFF, least attained service first—LAS). Namely, for a current flow of size s, and link bandwidth of B, $$FCT(s) = (\text{total \#bytes transmitted upon completing } s)/B \quad (1)$$

$$FCT^{FAIR}(s; F) = \frac{1}{B} \sum_{f:s_f < s} s_f + \frac{s}{B} |\{f : s_f \geq s\}|$$

$$FCT^{SFF}(s; F) = \frac{1}{B} \sum_{f:s_f < s} s_f$$

As described in conjunction with the description of step 706 above, the candidate resource with the best predicted performance is selected. This resource selection process is described in further detail by way of reference to FIGS. 8 and 9. The goal here is to place the flow to minimize the total FCT (see Equation 1, above). Namely, for each candidate resource for placing the task, which then serves as the destination of the flow generated by the task for reading input data, the FCT is predicted and the destination is chosen that has the minimum FCT. A further improvement is to minimize the total FCT increase. That is, to minimize FCT (s; F) (i.e., FCT of current flow)+ΔFCT (s; F) (i.e., increase in FCT of cross-flows—namely existing flows that share at least one link with the given flow). Total FCT increase can be predicted as follows:

Under fair share/LAS:

$$FCT^{FAIR}(s;F) = (\text{\#bytes of size} \leq s \text{ flows} + s^* \text{\#longer flows})/B = FCT^{fair}(s;F) \quad (2)$$

Under SFF:

$$\Delta FCT^{SFF}(F;s) = s^* \text{\#longer flows}/B \quad (3)$$

In both cases, $$FCT(s;F) + \Delta FCT(F;s) \sim FCT^{fair}(s;F)! \quad (4)$$

Figure 8:
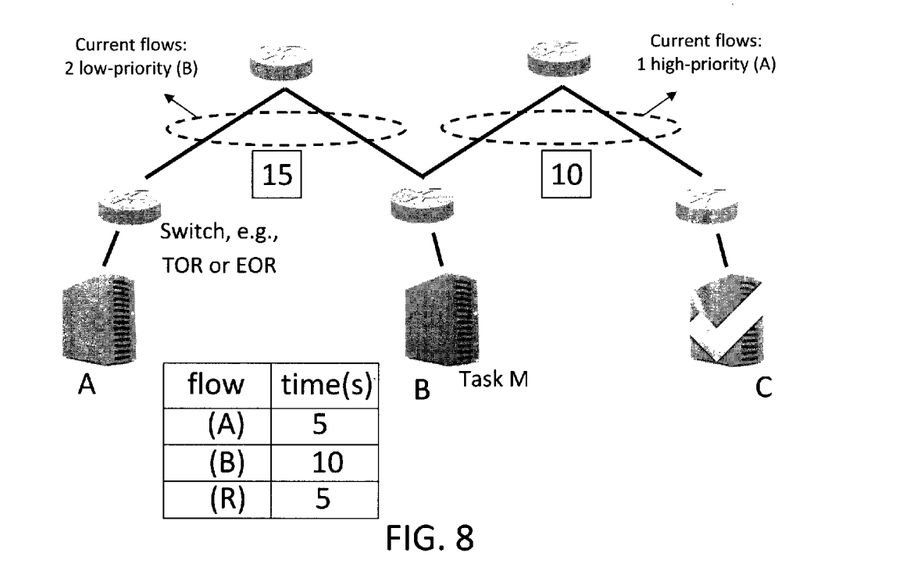
FIG. 8 is a diagram illustrating an example of resource selection according to an embodiment of the present invention.
Figure 9:
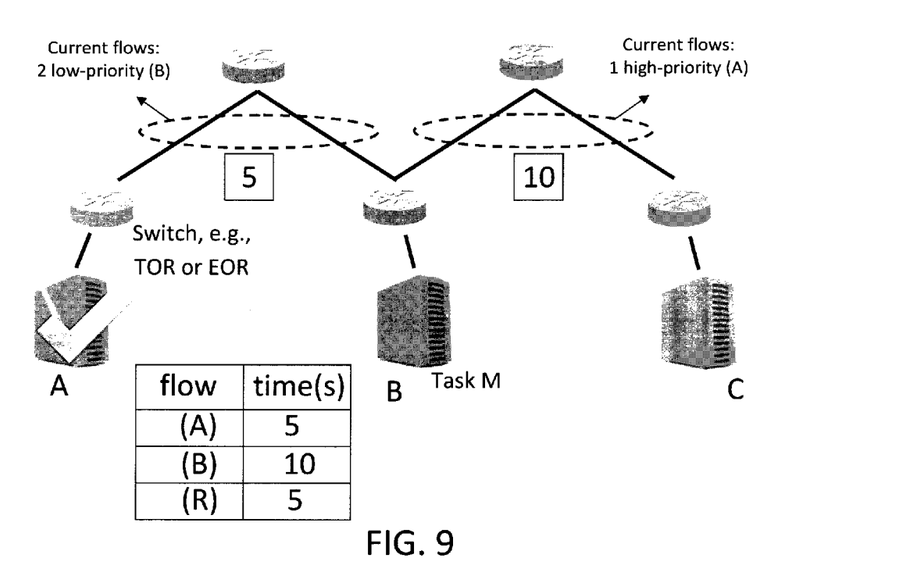
FIG. 9 is a diagram illustrating an example of resource selection with a change in the underlying network scheduling policy according to an embodiment of the present invention.

An example of this concept is shown in FIG. 8 which uses the same network topology as in FIG. 5 (i.e., the task scheduler needs to schedule a task R that needs the output data generated by an existing task M). In this example, the resource selection involves placing a task R on server A or server C under a fair share network scheduling policy. A table is provided in FIG. 8 showing the flows: A, B (existing) and (current) flow R, along with their respective times (in seconds s). Using Equation 2 above (for a network scheduling policy of fair share), if task R is placed at server A the total FCT=15, whereas if task R is placed at server C the total FCT=10. Thus, to minimize the total FCT (see above), task R would be placed at server C.

As provided above, FCT varies based on the underlying network scheduling policy. To illustrate this point, the same scenario is used, except that the network scheduling policy is changed from fair share to SFF. See FIG. 9. Based on Equation 3, above, under SFF if task R is placed at server C the total FCT=10 whereas if task R is placed at server A the total FCT=5. Thus, to minimize the total FCT, task R would in this case be placed at server A.

Figure 10:
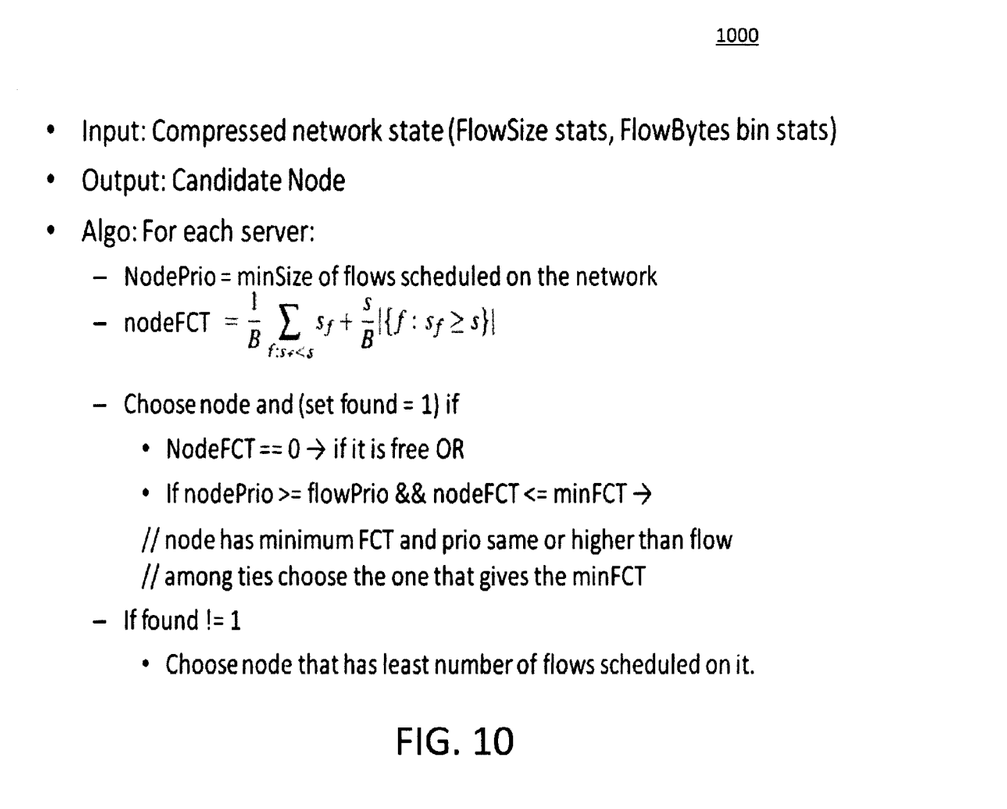
FIG. 10 is a diagram illustrating an exemplary methodology for placement of a given task on a candidate resource (i.e., server) according to an embodiment of the present invention.

Given the above FCT-based evaluation, an exemplary methodology 1000 is provided in FIG. 10 for placement of a given task on a candidate resource (also referred to as a candidate node—i.e., on the distributed network). As shown in FIG. 10, based on the network state, methodology 1000 determines the best candidate resource on which to place the task based on the resource and flow priorities (Prio) and FCT for each resource (i.e., server).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
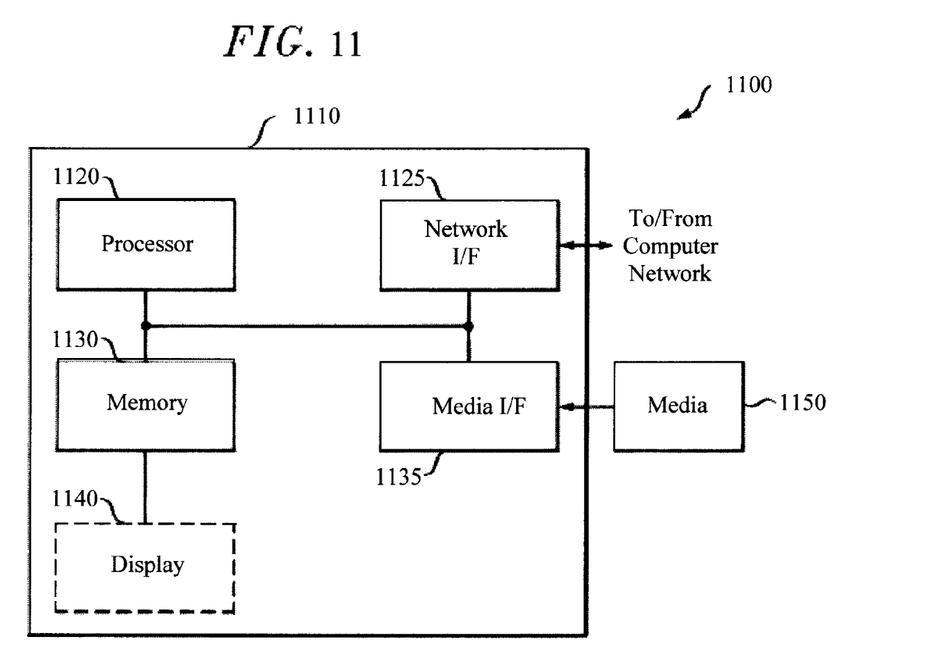
FIG. 11 is a diagram illustrating an exemplary apparatus for performing one or more of the methodologies presented herein according to an embodiment of the present invention.

Turning now to FIG. 11, a block diagram is shown of an apparatus 1100 for implementing one or more of the methodologies presented herein. By way of example only, apparatus 1100 can be configured to implement one or more of the steps of methodology 700 of FIG. 7, and/or one or more of the steps of methodology 1000 of FIG. 10.

Apparatus 1100 includes a computer system 1110 and removable media 1150. Computer system 1110 includes a processor device 1120, a network interface 1125, a memory 1130, a media interface 1135 and an optional display 1140. Network interface 1125 allows computer system 1110 to connect to a network, while media interface 1135 allows computer system 1110 to interact with media, such as a hard drive or removable media 1150.

Processor device 1120 can be configured to implement the methods, steps, and functions disclosed herein. The memory 1130 could be distributed or local and the processor device 1120 could be distributed or singular. The memory 1130 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1120. With this definition, information on a network, accessible through network interface 1125, is still within memory 1130 because the processor device 1120 can retrieve the information from the network. It should be noted that each distributed processor that makes up processor device 1120 generally contains its own addressable memory space. It should also be noted that some or all of computer system 1110 can be incorporated into an application-specific or general-use integrated circuit.

Optional display 1140 is any type of display suitable for interacting with a human user of apparatus 1100. Generally, display 1140 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for scheduling tasks in a distributed computing network, comprising the steps of:
   collecting a pool of candidate resources in the distributed computing network for performing a given one of the tasks;
   predicting a performance of each of the candidate resources in performing the given task based on both i) network state and ii) a scheduling policy of the distributed computing network; and
   selecting a best candidate resource for the given task based on the performance,
   wherein the performance is predicted based on a flow completion time (FCT), and wherein for a current flow of size s and link bandwidth of B, FCT(s)=(total #bytes transmitted upon completing s)/B.

2. The method of claim 1, wherein candidate resources comprise servers, virtual machines, or containers.

3. The method of claim 1, further comprising the step of: using delay scheduling to provide multiple candidate resources to serve as the pool of candidate resources.

4. The method of claim 1, wherein the predicting step comprises the steps of:
   hypothetically placing the given task on a given one of the candidate resources; and
   analyzing a schedule of the distributed computing network.

5. The method of claim 1, wherein the FCT for the given task varies based on both the network state and the scheduling policy of the distributed computing network.

6. The method of claim 1, wherein the selecting step further comprises the step of:
   selecting the best candidate resource that minimizes the FCT for the given task given both the network state and the scheduling policy of the distributed computing network.

7. The method of claim 1, wherein the state of the distributed computing network comprises sizes of all active flows in the distributed computing network.

8. The method of claim 1, wherein the scheduling policy of the distributed computing network is selected from the group consisting of: fair share, first in first out, shortest flow first, and least attained service first.

9. The method of claim 1, further comprising the step of:
   migrating at least one existing task on the best candidate resource for the given task to another one of the candidate resources.

10. The method of claim 9, wherein the existing task has a lower priority than the given task.

11. A system for scheduling tasks in a distributed computing network, the system comprising a memory coupled with a processor device, the memory embodying instructions that, when executed by the processor device, cause the processor device to implement:
    a task scheduler; and
    a network scheduler,
    wherein the network scheduler is configured to provide a network state and a scheduling policy of the distributed computing network to the task scheduler, and wherein the task scheduler is configured to schedule the tasks in the distributed computing network based on both i) the network state and ii) the scheduling policy of the distributed computing network, wherein the task scheduler is further configured to: collect a pool of candidate resources in the distributed computing network for performing a given one of the tasks; predict a performance of each of the candidate resources in performing the given task based on both i) the network state and ii) the scheduling policy of the distributed computing network; and select a best candidate resource for the given task based on the performance, wherein the performance is predicted based on a FCT, and wherein for a current flow of size s and link bandwidth of B, FCT(s)=(total #bytes transmitted upon completing s)/B.

12. The system of claim 11, wherein the task scheduler is further configured to:
    use delay scheduling to provide multiple candidate resources to serve as the pool of candidate resources.

13. The system of claim 11, wherein the task scheduler is further configured to:
    hypothetically place the given task on a given one of the candidate resources; and
    analyze a schedule of the distributed computing network.

14. The system of claim 11, wherein the task scheduler is further configured to:
    migrate at least one existing task on the best candidate resource to another one of the candidate resources.

15. The system of claim 14, wherein the existing task has a lower priority than the given task.

16. The system of claim 10, wherein the FCT varies for the given task based on both the network state and the scheduling policy of the distributed computing network.

17. A computer program product for scheduling tasks in a distributed computing network, the computer program product comprising a computer-readable storage medium having program instructions embodied therewith, the program instructions executable by a computer to cause the computer to:
- collect a pool of candidate resources in the distributed computing network for performing a given one of the tasks;
- predict a performance of each of the candidate resources in performing the given task based on both i) network state and ii) a scheduling policy of the distributed computing network; and
- select a best candidate resource for the given task based on the performance,
- wherein the performance is predicted based on a FCT, and wherein for a current flow of size s and link bandwidth of B, FCT(s)=(total #bytes transmitted upon completing s)/B.

\* \* \* \* \*